United States Patent
D'Amato et al.

(10) Patent No.: US 9,430,333 B2
(45) Date of Patent: Aug. 30, 2016

(54) RECOVERY OF APPLICATION FROM SNAPSHOT

(71) Applicant: Microsoft Technology Licensing, LLC, Redmond, WA (US)

(72) Inventors: Andrea D'Amato, Kirkland, WA (US); Vinod R. Shankar, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 13/829,204

(22) Filed: Mar. 14, 2013

(65) Prior Publication Data

US 2014/0281709 A1    Sep. 18, 2014

(51) Int. Cl.
*G06F 11/00* (2006.01)
*G06F 11/14* (2006.01)

(52) U.S. Cl.
CPC ....... *G06F 11/1458* (2013.01); *G06F 11/1469* (2013.01); *G06F 11/1484* (2013.01); *G06F 2201/825* (2013.01); *G06F 2201/84* (2013.01)

(58) Field of Classification Search
CPC .......... G06F 11/1402; G06F 11/1412; G06F 11/1446; G06F 11/1458; G06F 11/1469; G06F 2201/80; G06F 2201/82; G06F 2201/84; G06F 2201/85; G06F 11/1484
USPC ...................................... 714/15, 19
See application file for complete search history.

(56) References Cited

U.S. PATENT DOCUMENTS

| | | | | |
|---|---|---|---|---|
| 5,313,626 | A * | 5/1994 | Jones et al. | 714/5.11 |
| 5,822,584 | A * | 10/1998 | Thompson et al. | 718/103 |
| 6,185,699 | B1 * | 2/2001 | Haderle et al. | 714/19 |
| 6,397,351 | B1 * | 5/2002 | Miller et al. | 714/13 |
| 6,434,681 | B1 | 8/2002 | Armangau | |
| 6,848,106 | B1 * | 1/2005 | Hipp | 719/312 |
| 7,055,059 | B2 | 5/2006 | Yanai et al. | |
| 7,234,077 | B2 * | 6/2007 | Curran et al. | 714/15 |
| 7,409,510 | B2 | 8/2008 | Werner et al. | |
| 7,426,618 | B2 | 9/2008 | Vu et al. | |
| 7,650,533 | B1 * | 1/2010 | Saxena et al. | 714/6.12 |
| 7,702,868 | B1 | 4/2010 | Hardman | |

(Continued)

OTHER PUBLICATIONS

"International Search Report & Written Opinion for PCT Patent Application No. PCT/US2014/023072", Mailed Date: Jul. 24, 2014, Filed Date: Mar. 11, 2014, 11 Pages.

(Continued)

*Primary Examiner* — Marc Duncan
(74) *Attorney, Agent, or Firm* — Henry Gabryjelski; Doug Barker; Micky Minhas

(57) ABSTRACT

The targeted recovery of application-specific data corresponding to an application without performing recovery of the entire volume. The recovery is initiated by beginning to copy the prior state of the content of an application-specific data container from a prior snapshot to the application-specific data container in an operation volume accessible by the application. However, while the content of the application-specific data container is still being copied from the snapshot to the application-specific data container, the application is still permitted to perform read and write operations on the application-specific data container. Thus, the application-specific data container appears to the application to be fully accessible even though recovery of the content of the application-specific data container is still continuing in the background.

20 Claims, 5 Drawing Sheets

(56) References Cited

U.S. PATENT DOCUMENTS

| | | | |
|---|---|---|---|
| 7,765,553 B2* | 7/2010 | Douceur et al. | 718/107 |
| 7,774,565 B2* | 8/2010 | Lewin et al. | 711/162 |
| 7,822,758 B1 | 10/2010 | Prakash et al. | |
| 7,856,425 B2 | 12/2010 | Spear et al. | |
| 7,937,547 B2* | 5/2011 | Liu et al. | 711/162 |
| 8,332,689 B2 | 12/2012 | Timashev et al. | |
| 8,607,009 B2* | 12/2013 | Nicholas et al. | 711/162 |
| 8,726,083 B1* | 5/2014 | van der Goot | 714/19 |
| 8,788,878 B2* | 7/2014 | Kaushik et al. | 714/6.3 |
| 8,826,066 B2* | 9/2014 | Hama | 714/6.23 |
| 8,909,602 B2* | 12/2014 | Soundararajan et al. | 707/639 |
| 2004/0030951 A1 | 2/2004 | Armangau | |
| 2004/0059958 A1* | 3/2004 | Umberger et al. | 714/5 |
| 2005/0102552 A1* | 5/2005 | Horn | 714/6 |
| 2005/0193026 A1* | 9/2005 | Prahlad et al. | 707/200 |
| 2006/0143501 A1* | 6/2006 | Tormasov et al. | 714/5 |
| 2006/0161808 A1 | 7/2006 | Burkey | |
| 2007/0055833 A1 | 3/2007 | Vu et al. | |
| 2007/0174669 A1* | 7/2007 | Ebata et al. | 714/6 |
| 2007/0245104 A1* | 10/2007 | Lindemann et al. | 711/162 |
| 2011/0196842 A1* | 8/2011 | Timashev et al. | 707/679 |
| 2012/0017114 A1 | 1/2012 | Timashev et al. | |
| 2012/0151136 A1 | 6/2012 | Hay et al. | |
| 2012/0173792 A1* | 7/2012 | Lassa et al. | 711/103 |
| 2012/0266019 A1* | 10/2012 | Sim-Tang | 714/21 |
| 2012/0310896 A1* | 12/2012 | Freedman et al. | 707/679 |
| 2013/0067274 A1* | 3/2013 | Huang et al. | 714/6.22 |
| 2013/0117359 A1* | 5/2013 | Husain et al. | 709/203 |
| 2014/0223126 A1* | 8/2014 | Ye | 711/162 |
| 2015/0169413 A1* | 6/2015 | Ngo et al. | 711/162 |
| 2015/0212894 A1* | 7/2015 | Pawar | G06F 11/1448 707/679 |

OTHER PUBLICATIONS

"International Preliminary Report on Patentability Issued in PCT Application No. PCT/US2014/023072", Mailed Date: Jun. 17, 2015, 8 Pages.

* cited by examiner

RECOVERY OF APPLICATION FROM SNAPSHOT

BACKGROUND

Computers and computing systems have affected nearly every aspect of modern living. Computers are generally involved in work, recreation, healthcare, transportation, entertainment, household management, etc. Computer functionality is typically the result of computing systems executing software code. The computer uses a volume to store the software code, and also to store data.

Occasionally, the volume may become corrupted, or the volume itself may be damaged. In either case, the volume is rendered unusable. In order to prepare for such a failure event, a computing system may cause periodic snapshots of the volume to be taken. If a failure event occurs, the volume may be replaced if damaged, and a recovery module may facilitate recovery of the volume by copying back from the latest valid snapshot into the volume. Thus, despite failure of the volume, the volume is returned to a prior state, allowing computer functionality to return.

SUMMARY

In accordance with at least one embodiment described herein, the targeted recovery of application-specific data corresponding to an application is described. As an example, the application might be a virtual machine, while the application-specific data might be a virtual hard drive that corresponds to the virtual machine. The recovery of the application-specific data is performed without performing recovery of the entire volume.

The recovery is initiated by beginning to copy the prior state of the content of an application-specific data container from a prior snapshot to the application-specific data container in an operation volume accessible by the application. However, while the content of the application-specific data container is still being copied from the snapshot to the application-specific data container, the application is still permitted to perform read and write operations on the application-specific data container. Thus, the application-specific data container appears to the application to be fully accessible even though recovery of the content of the application-specific data container is still continuing in the background.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the targeted recovery of application-specific data corresponding to an application without performing recovery of the entire volume is described. The recovery is initiated by beginning to copy the prior state of the content of an application-specific data container from a prior snapshot to the application-specific data container in an operation volume accessible by the application. However, while the content of the application-specific data container is still being copied from the snapshot to the application-specific data container, the application is still permitted to perform read and write operations on the application-specific data container using the principles described further below. Thus, the application-specific data container appears to the application to be fully accessible even though recovery of the content of the application-specific data container is still continuing in the background.

Some introductory discussion of a computing system will be described with respect to FIG. 1. Then, the targeted recovery will be described in the order provided above with respect to FIGS. 2 through 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
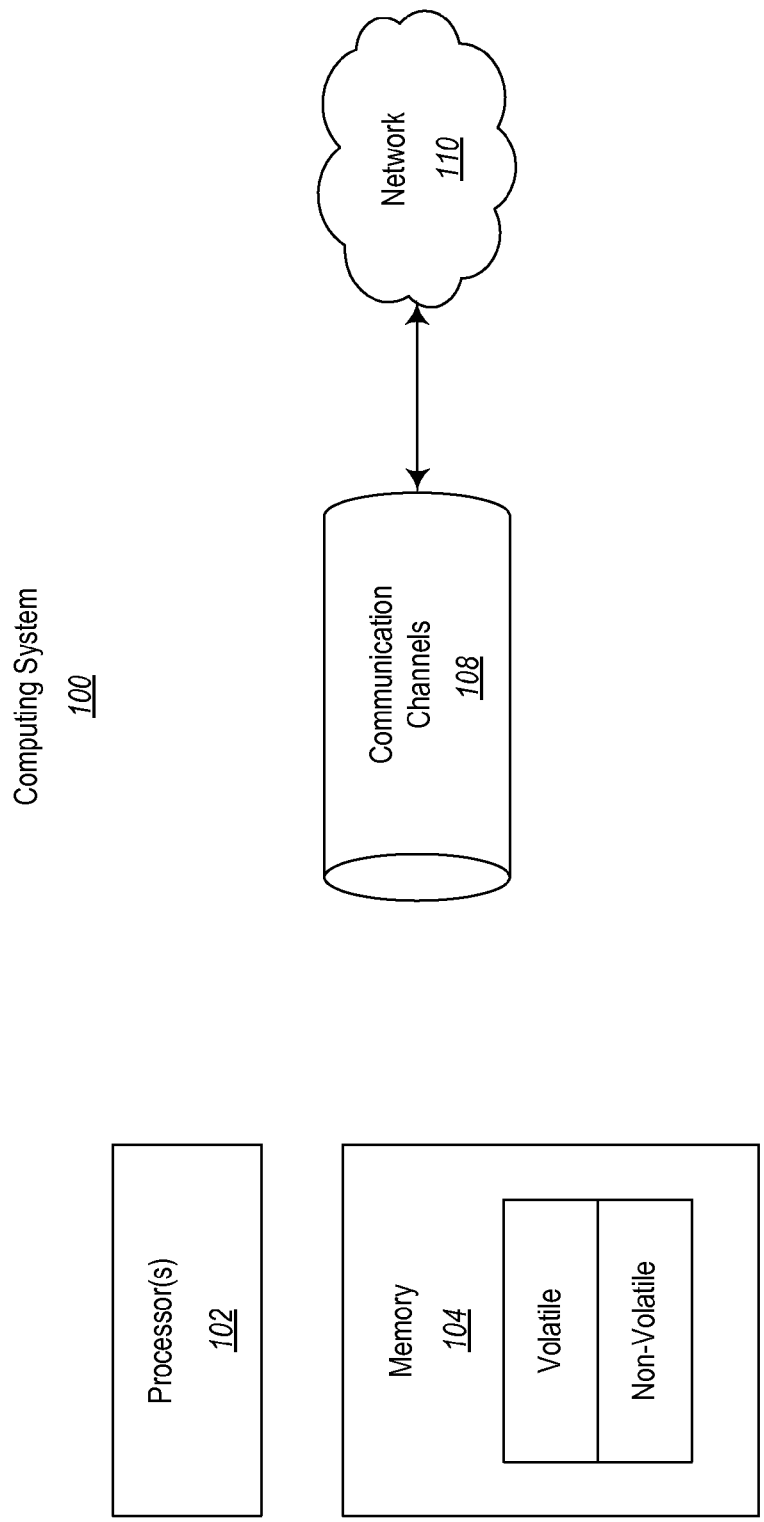
FIG. 1 abstractly illustrates a computing system in which some embodiments described herein may be employed.

As illustrated in FIG. 1, in its most basic configuration, a computing system 100 includes at least one processing unit 102 and computer-readable media 104. The computer-readable media 104 may conceptually be thought of as including physical system memory, which may be volatile, non-volatile, or some combination of the two. The computer-readable media 104 also conceptually includes non-volatile mass storage. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
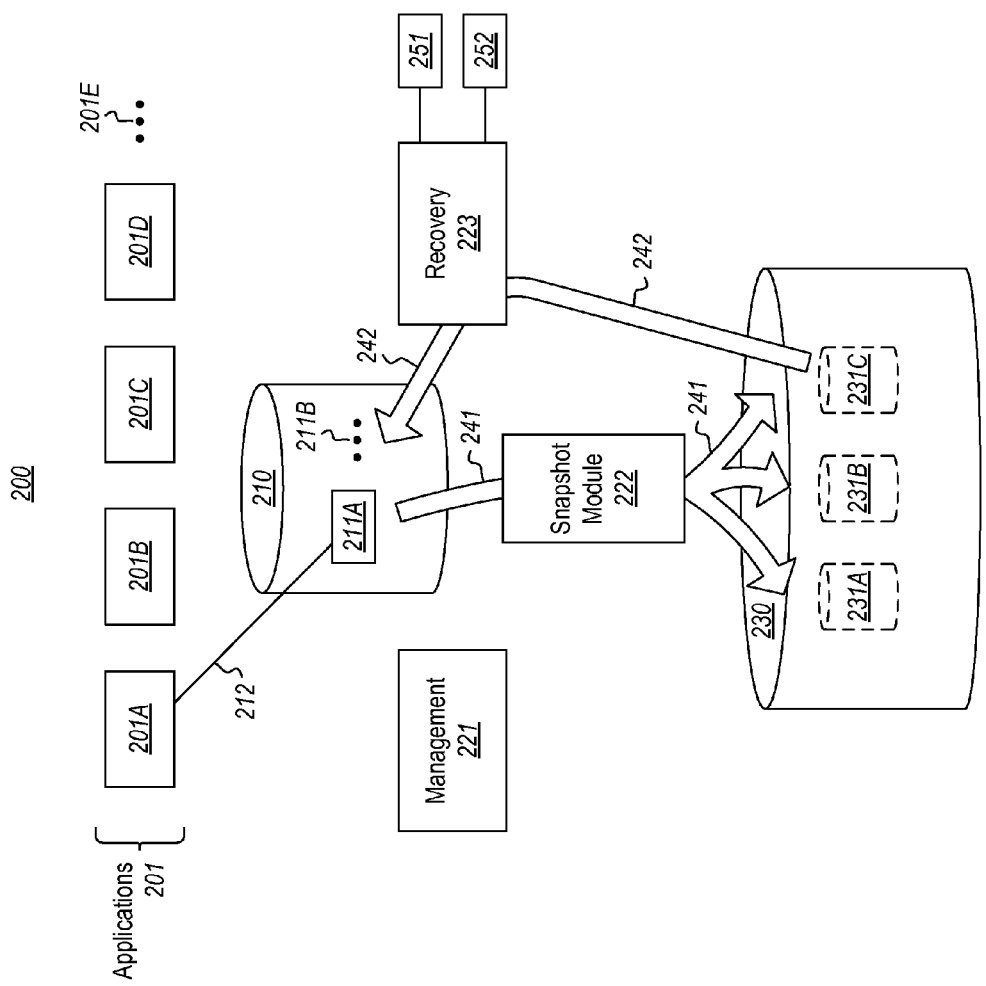
FIG. 2 schematically illustrates an example system in which targeted recovery of an application may occur without recovering the entire system in accordance with the principles described herein.

FIG. 2 schematically illustrates an example system 200 in which targeted recovery of an application may occur without recovering the entire system in accordance with the principles described herein. The system 200 includes an operational volume 210 accessible to multiple applications 201, so that the applications 201 may read to and write from the operational volume 210. For instance, the applications 201 are illustrated as including four applications 201A, 201B, 201C and 201D, although the ellipses 201E represent that the principles described herein are not limited at all to a system that operates a particular number of applications. The system 200 may operate a single application 201A or perhaps thousands of applications that all share the operational volume 210. A "volume" is a single namespace that is recognized by the file system as including contiguous logical or physical addresses.

The operational volume 210 stores an application-specific data container 211A, although the operational volume 210 may store voluminous amounts of data other than the application-specific data container as represented by the ellipses 211B. The application-specific data container 211A is associated with application 201A as represented by the line 212. The application-specific data container 211A may be, for example, an application-specific file.

In one example, the applications 201 may each be virtual machines. In that case, the application 201A may be a virtual machine, and the application-specific data container 211A might be a virtual hard drive associated with the application 201A. In that case, the system 200 may be a portion of a host computing system that hosts multiple virtual machines. The host computing system may have multiple volumes, although only the one volume 210 is illustrated in FIG. 2.

The principles described herein permit for convenient recovery of an application-specific data container without recovering the entire volume in which the application-specific data container is stored. For instance, in FIG. 2, the application-specific data container 211A may be recovered without recovering the entire volume 210. This is helpful in that sometimes the application-specific data container 211A may become corrupted or untrusted, while the volume 210 itself remains uncorrupted as a whole. Furthermore, recovery of the entire volume might take much longer than the recovery of just a portion of the volume.

Significantly, the system 200 further operates such that the application 201A may continue to operate on the application-specific data container 211A while the recovery of the application-specific data container 211A is occurring in the background. Thus, from the perspective of the application 201A, the recovery happens quickly, and perhaps in an imperceptible amount of time, whilst the recovery actually occurs in the background over a much longer period of time.

In order to facilitate this targeted and rapid recovery, the system 200 includes a number of executable modules including a management module 221, a snapshot module 222, and a recovery module 223. Each of these modules will be further described below.

The modules 221 through 223 may each be instantiated and/or operated by a computing system (such as computing system 100) in response to the processors (e.g., processor(s) 102) of the computing system executing one or more computer-executable instructions stored on a computing-readable storage media comprising a computer program product. Although specific acts are described as being associated with the modules 221 and 223, such acts need not be performed by the specific modules described.

In order to prepare for a possible need for recovery, the snapshot module 222 takes snapshots of at least the application-specific data container 211A but perhaps a larger segment of the volume 210 or even perhaps the entire volume 210 as a whole. These snapshots may be periodic and/or in response to particular events. In any case, FIG. 2 illustrates an example in which the snapshot module has taken three snapshots 231A, 231B and 231C of the application-specific data container 211A and provided the snapshots 231A, 231B and 231C in a snapshot volume 230 as represented by multi-headed arrow 241. In this example, the snapshot 231A is the oldest snapshot, the snapshot 231B is the second snapshot taken, and the snapshot 231C is the most recent snapshot of the application-specific data container 211A.

The management module 221 determines if and when the application-specific data container is to be subject to recovery from a snapshot within the snapshot volume 230. In response, the recovery module 223 performs the recovery of the application-specific data container 211A from the snapshot 231C in the snapshot volume 230 to repopulate the content of the application-specific data container 221A as represented by the arrow 242. While the application-specific data container 211A might momentarily not be available to the application 201A while the recovery is initiated, immediately after the recovery is initiated, the management module 221 may permit the application 201A to perform read and write operations on the application-specific data container 211A.

Figure 3:
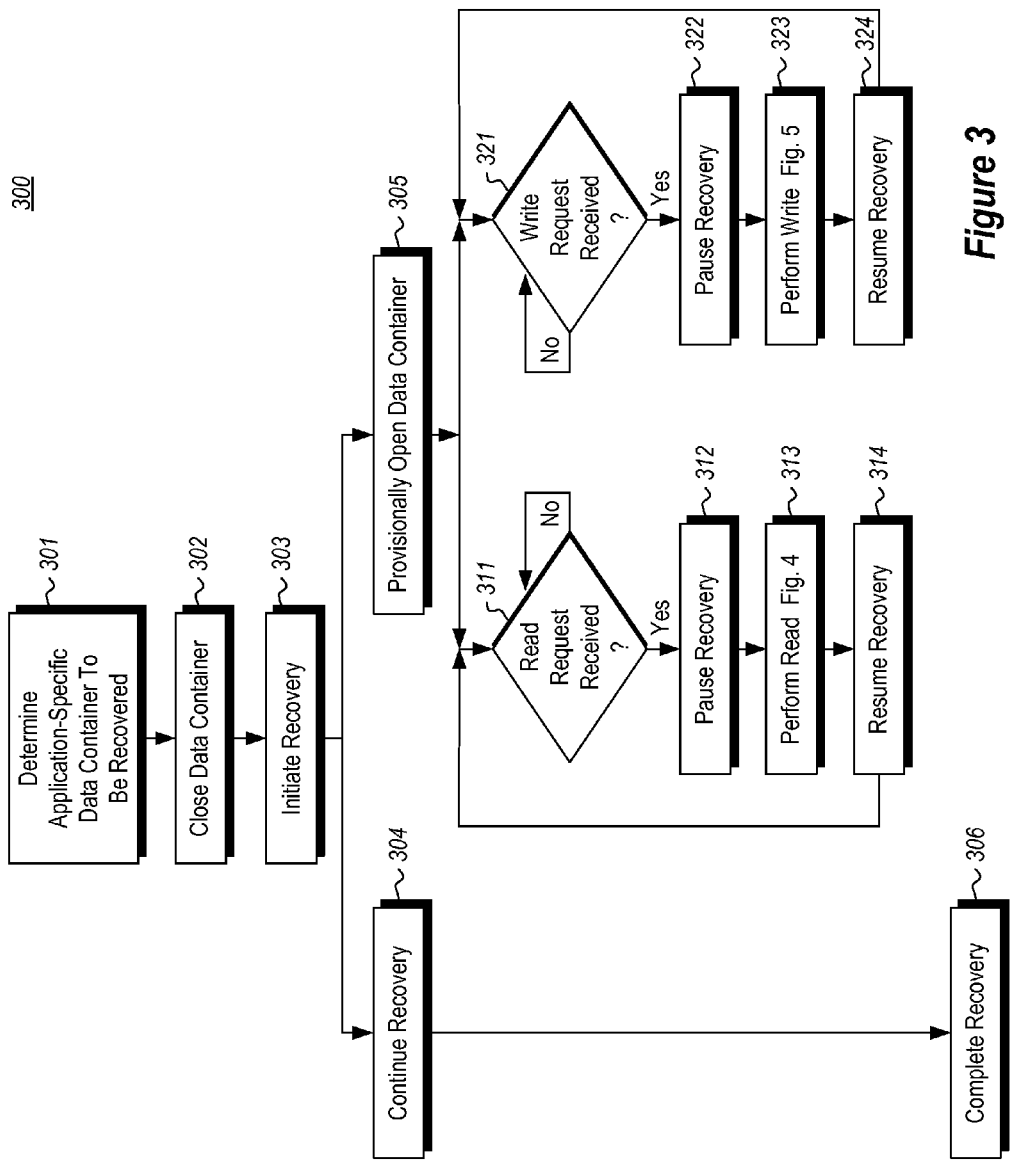
FIG. 3 illustrates a flowchart of a method for recovering application specific data corresponding to an application.

FIG. 3 illustrates a flowchart of a method 300 for recovering application specific data corresponding to an application. As the method 300 may be performed within the system 200 of FIG. 2, the method 300 will now be described with respect to FIG. 2.

The method 300 is initiated upon determining that a particular application-specific data container of an application is to be subject to recovery from a snapshot (act 301). For instance, referring to FIG. 2, the management module 221 determines that the application-specific container 211A of the application 201A is to be subject to recovery from snapshot 231C.

In response, the method temporarily makes the application-specific data container unavailable to the application by, for example, closing the application-specific data container (act 302). For instance, in FIG. 2, the management component 221 may close the application-specific data container 211A. The application-specific data container 211A will remain closed for but a brief time compared to the total length of the recovery operation. Furthermore, the application-specific data container 211A is closed without closing the operational volume 210, thus keeping the operational volume 210 available to at least one other application (e.g., application 201B) while the application-specific data container 211A is closed.

The recovery operation is then initiated (act 303). For instance, in the case of FIG. 2, the recovery module 223 initiates recovery by beginning to copy a prior state of content of the application-specific data container 201A from a prior snapshot 231C as represented by arrow 242. The recovery module 223 will proceed to copy from the prior snapshot 231C one region of the application-specific data container 201A at a time. Prior to recovering a region, the recovery module 223 will take a range lock for that region.

Once the recovery operation is initiated, the application-specific data container is opened (act 305) thereby permitting the application to perform read and write operations on the application-specific data container, so long as there are no range locks held by the recovery module on the region that contains the memory location being read from or written to. The application-specific data container is opened even though the recovery operation continues (act 304), and in fact, may have only begun moments before. Thus, referring to FIG. 2, the recovery module 223 continues the recovery in the background (as represented by arrow 242), while the management module 221 continues to allow the application 201A to perform read and write operations on the application-specific data container 211A.

While the recovery is still in process (act 304), the management module 221 operates to respond to read and write requests from the application 201A in a manner that the read and write requests are honored consistent with the recovery as described herein.

For instance, upon detecting that the application 201A issues a read request for an address region of content from the application-specific data container ("Yes" in decision block 311), the management module 221 causes the recovery to momentarily pause for that address region (act 312) such that if the recovery approaches close to that address region, or even reaches that address region, the recovery pauses. The read operation is performed (act 313), and thereafter the recovery for that address region is resumed such that if the recovery were to approach or arrive at the region, the recovery would not pause (act 314). As an example, the read operation may be performed in the manner illustrated and described with respect to FIG. 4. The acts 312 through 314 might be performed each time the application 201A issues a read request to the application-specific data container 211A.

Upon detecting that the application 201A issues a write request to an address region of the application-specific data container ("Yes" in decision block 321), the management module 221 again causes the recovery to momentarily pause for that address region (act 322) such that if the recovery approaches close to that address region, or even reaches that address region, the recovery pauses. The write operation is performed (act 323), and thereafter the recovery is resumed such that if the recovery were to approach or arrive at the region, the recovery would not pause (act 324). As an example, the write operation may be performed in the manner illustrated and described with respect to FIG. 5. The acts 312 through 314 might be performed each time the application 201A issues a read request to the application-specific data container 211A.

Figure 4:
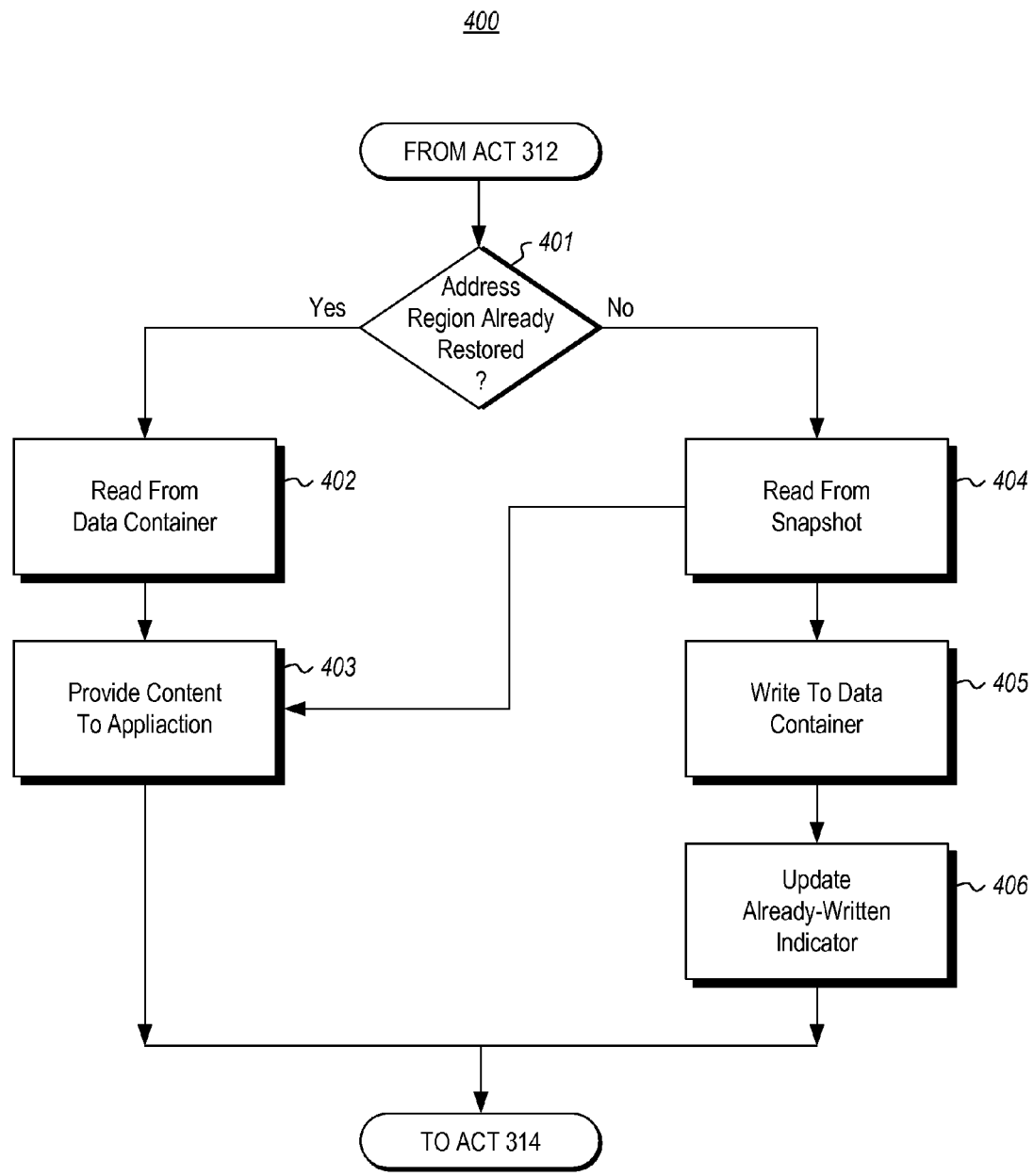
FIG. 4 illustrates a flowchart of a method for performing a read operation while a recovery operation is still ongoing.

FIG. 4 illustrates a method 400 for responding to a read request while the recovery operation is still in process. The method 400 may be performed in order to perform the read operation of act 313 in FIG. 3. Thus, the method 400 may be initiated after act 312 in FIG. 3.

The method 400 determines whether the address region corresponding to the read request is already restored to the application-specific data container in the operational volume (decision block 401). This may be accomplished by the recovery module 223 consulting a recovery progress status 251. For instance, if the recovery module 223 copies the content from the snapshot 231C sequentially, the recovery progress status 251 might represent a high water mark representing the highest address recovered into the application-specific data container. In addition, this may be accomplished by the recovery module 223 consulting an already written indication 252 that the address region of the application-specific data container has been written to since the beginning of the recovery. For instance, the address region might have been written to in response to the performance of method 500 or in response to act 406 in FIG. 4 described further below, even though the address region has not yet been reached yet through the normal recovery performed by act 304.

If the address region for the read request is already restored to the application-specific data container ("Yes" in decision block 401), the content of the address region is read from the application-specific data container in the operational volume (act 402) and is thus made available to the application 201A in response to the read request (act 403). If the address region for the read request is not already restored to the application-specific data container ("No" in decision block 401), the content is read instead from the corresponding portion of the snapshot (act 404), and the content is provided to the application (act 403) whilst the read content is also optionally provided to the application-specific data container (act 405). Furthermore, the already written indication is optionally updated (act 406) to reflect that a write has occurred to the address region of the application-specific data container since the recovery began. Once the read operation completes, the method 400 returns to act 314 of FIG. 3, where the recovery operation resumes. The method 400 may be repeated numerous times for each read request received during the recovery process. Once the recovery process completes (act 306), read operations may continue as normal, without intervention from the management module 221.

Figure 5:
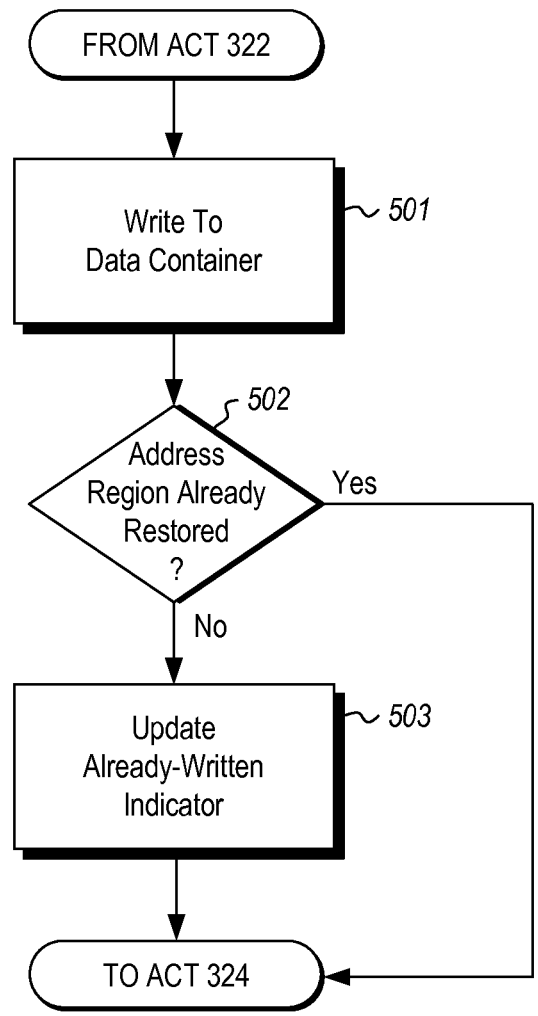
FIG. 5 illustrates a flowchart of a method for performing a write operation while a recovery operation is still ongoing.

FIG. 5 illustrates a method 500 for responding to a write request while the recovery operation is still in process. The method 500 may be performed in order to perform the write operation of act 323 in FIG. 3. Thus, the method 500 may be initiated after act 322 in FIG. 3.

The method 500 performs the write operation by writing the associated content of the write request is written to the address region of the application-specific data container in the operation volume (act 501). The method 500 also determines whether the address region corresponding to the write request is already restored to the application-specific data container in the operational volume (decision block 502). This again may be accomplished by the recovery module 223 consulting a recovery progress status 251. In addition, this may be accomplished by the recovery module 223 consulting an already-written indication 252 that the address region of the application-specific data container has been written to since the beginning of the recovery. For instance, the address region might have been written to in response to a previous performance of method 500 or in response to act 406 in FIG. 4, even though the address region has not yet been reached yet through the normal recovery performed by act 304.

If the address region for the write request is already restored to the application-specific data container ("Yes" in decision block 502), this completes the write operation, thereby returning to act 324 in FIG. 3 to resume the restore operation. If the address region for the write request has not already been restored to the application-specific data container ("No" in decision block 502), the already written indicator 252 is updated to reflect that the address region has been written to since the recovery operation began (act 503). Thereafter, again thereby returning to act 324 in FIG. 3 to resume the restore operation. The method 500 may be repeated numerous times for each write request received during the recovery process. Once the recovery process completes (act 306), write operations may continue as normal, without intervention from the management module 221.

From the perspective of the recovery module, the recovery module 223 determines that a particular application-specific data container of an application is to be subject to recovery from a snapshot. For instance, the recovery module 223 may have received an instruction to recover from the management module 221 in response to the management module 221 performing act 301 in FIG. 3. In response, the recovery module initiates recovery.

The recovery module continues the recovery by copying content from the snapshot to the application-specific data container one portion at a time, which is analogous to act 304 in FIG. 3. The recovery module does respond to instructions to pause and resume recovery in response to acts 312, 314, 322 and 324, but otherwise simply moves forward with recovery. Despite such momentary pauses, the recovery operation will still be said to be continuing as shown in act 304.

The recovery module also tracks at least one address region corresponding to a write request that is made on the application-specific container in the operational volume apart from the recovery. For instance, this may be accomplished using the already-written indicator 252 in FIG. 2. When copying one portion at a time from the snapshot, the recovery module skips copying for any addresses that have already been written as indicated within the indicator 252. This prevents the recovery from overwriting newer data created by allowing the application 201A to continue processing during the recovery.

An example implementation of how collision avoidance may be facilitated will now be described, first from the perspective of the read/write operation, and then from the perspective of the recovery.

When the application issues a read or write request, the system takes a range lock for the region addressed by the read or write request. If the recovery is working on the same range, then this read/write operation will be pended to be resumed later. Second, a high water mark of the recovery (an example of the recovery progress status 251) is evaluated, along with a dirty map (an example of the already-written indicator 252) is evaluated, to determine the appropriate action as described above. For instance, for a read operation, it is determined whether to read from the data container (act 402), or whether to read from the snapshot (act 403). For a write operation, it is determined whether the dirty map needs to be updated to reflect a write (act 503). The appropriate I/O operation is then performed, and then the range lock is released for the region. If a recovery got pended for this region, then the recovery is resumed for the region.

The collision avoidance from the recovery perspective occurs one range of addresses at a time. For each region to be recovered, the recovery process takes a range lock for the region to be recovered. If a read/write operation already has a range lock on that region, the recovery on the region is pended to be resumed later on read/write completion. Once the recovery is able to obtain the range lock on that region, recovery is performed based on the dirty map. For instance, recovery will skip copying from the snapshot for all of those addresses that are marked as already having been written to in the dirty map. Once the region is recovered, the recovery process release the range lock. This allows any pended read/write request to complete on that range.

Thus, the principles described herein provide an effective and efficient mechanism for targeted recovery of an application-specific data container without requiring recovery of the entire volume, and also while allowing the application to continue operating on the application-specific data container that is in the process of being recovered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for recovering application specific data corresponding to an application, the method comprising:
   an act of determining that an application-specific data container is to be recovered from a snapshot, the application-specific data container comprising data that corresponds to a particular application, the snapshot comprising data from an operational volume comprising data in addition to data corresponding to the application-specific data container;
   in response to the act of determining, initiating recovery of a prior state of content of the application-specific data container from the snapshot by beginning to copy a prior version of the content from the snapshot to the application-specific data container in the operational volume while not recovering the data in addition to the data corresponding to the application-specific data container, such that only the prior state of content of the application-specific data container is recovered from the snapshot;
   while the prior version of the content of the application-specific data container is being copied from the snapshot to the application-specific data container, permitting the particular application to perform read and write operations on the application-specific data container.

2. The method in accordance with claim 1, further comprising:
   after the act of permitting the application to perform read and write operations on the application-specific container, but before the recovery is complete, an act of detecting that the application issued a read request for an address region of content from the application-specific data container.

3. The method in accordance with claim 2, further comprising:
   an act of pausing the recovery after the act of detecting that the application issued a read request for an address region of content from the application-specific data container;
   an act of performing the read operation; and
   after the act of performing the read operation, an act of resuming the recovery.

4. The method in accordance with claim 2, further comprising the following in response to the read request:
   an act of determining that the address region corresponding to the read request is already restored to the application-specific data container in the operational volume; and
   in response to the act of determining that the address region corresponding to the read request is already restored, an act of reading the content of the address region from the application-specific data container in the operation volume.

5. The method in accordance with claim 4, wherein the act of determining that the address region corresponding to the read request is already restored is performed by consulting a progress of the copying of the prior version of the content from the snapshot to the application-specific data container in the operation volume.

6. The method in accordance with claim 4, wherein the act of determining that the address region corresponding to the read request is already restored is performed by reviewing an indication that the address region of the application-specific data container has been written to since the beginning of the recovery.

7. The method in accordance with claim 2, further comprising the following in response to the read request:
   an act of determining that the address region corresponding to the read request has not already been restored to the application-specific data container in the operational volume; and
   in response to the act of determining that the address region corresponding to the read request has not already been restored, an act of reading the content from the snapshot; and
   an act of providing the read content to the application.

8. The method in accordance with claim 7, further comprising:
   in response to the act of reading the content from the snapshot, an act of writing the read content to the address region of the application-specific data container of the operational volume.

9. The method in accordance with claim 1, further comprising:
   after the act of permitting the application to perform read and write operations on the application-specific container, but before the recovery is complete, an act of detecting that the application issued a write request to an address region of the application-specific data container.

10. The method in accordance with claim 9, further comprising:
    an act of pausing the recovery after the act of detecting that the application issued a write request to an address region of the application-specific data container;
    an act of performing the write operation; and after the act of performing the write operation, an act of resuming the recovery.

11. The method in accordance with claim 9, further comprising the following in response to the write request:
an act of determining that the address region corresponding to the write request is already restored to the application-specific data container in the operational volume; and
in response to the act of determining that the address region corresponding to the write request is already restored, an act of writing content corresponding to the write request to the address region from the application-specific data container in the operation volume.

12. The method in accordance with claim 11, wherein the act of determining that the address region corresponding to the write request is already restored is performed by consulting a progress of the copying of the prior version of the content from the snapshot to the application-specific data container in the operation volume.

13. The method in accordance with claim 11, wherein the act of determining that the address region corresponding to the write request is already restored is performed by reviewing an indication that the address region of the application-specific data container has been written to since the beginning of the recovery.

14. The method in accordance with claim 9, further comprising the following in response to the write request:
an act of determining that the address region corresponding to the write request has not already been restored to the application-specific data container in the operational volume;
in response to the act of determining that the address region corresponding to the write request has not already been restored, an act of writing the content to the address region of the application-specific container in the operational volume; and
in response to the act of writing, an act of recording an indication that the address region of the application-specific container has been written to since the beginning of the recovery.

15. The method in accordance with claim 1, further comprising the following after the act of determining that the application-specific data container of an application is to be subject to recovery from a snapshot and before the act of initiating recovery:
an act of closing the application-specific data container so as to not be accessible to the application.

16. The method in accordance with claim 15, wherein the act of closing the application-specific data container is performed without closing the operational volume, thus keeping the operational volume available to at least one other application while the application-specific data container is closed.

17. The method in accordance with claim 1, wherein the application comprises a virtual machine.

18. The method in accordance with claim 17, wherein the application-specific data container comprises a virtual hard drive.

19. A computer program product comprising at least one computer-readable storage device having stored thereon computer-executable instructions that are structured such that, when executed by one or more processors of a computing system, cause the computing system to perform a method for recovering application specific data corresponding to an application, the method comprising:
an act of determining that an application-specific data container is to be recovered from a snapshot, the application-specific data container comprising data that corresponds to a particular application, the snapshot comprising data from an operational volume comprising data in addition to data corresponding to the application-specific data container;
in response to the act of determining, initiating recovery of a prior state of content of the application-specific data container from the snapshot by beginning to copy a prior version of the content from the snapshot to the application-specific data container in the operational volume while not recovering the data in addition to the data corresponding to the application-specific data container, such that only the prior state of content of the application-specific data container is recovered from the snapshot;
tracking progress of copying of the prior version of the content from the snapshot to the application-specific container;
tracking at least one address region corresponding to a write request that is made on the application-specific container in the operational volume apart from the recovery; and
skipping the at least one address region when arriving at the at least one address region in the recovery.

20. A system in which targeted recovery of an application may occur without recovering the entire system, the system comprising:
one or more computer processors; and
computer memory having stored therein computer-executable instructions for performing steps for recovering application specific data corresponding to an application, the computer-executable instructions, when executed on the one or more computer processors, causing the system to be configured to perform:
determining that an application-specific data container is to be recovered from a snapshot, the application-specific data container comprising data that corresponds to a particular application, the snapshot comprising data from an operational volume comprising data in addition to data corresponding to the application-specific data container;
in response to determining, initiating recovery of a prior state of content of the application-specific data container from the snapshot by beginning to copy a prior version of the content from the snapshot to the application-specific data container in the operational volume while not recovering the data in addition to the data corresponding to the application-specific data container, such that only the prior state of content of the application-specific data container is recovered from the snapshot;
while the prior version of the content of the application-specific data container is being copied from the snapshot to the application-specific data container, permitting the particular application to perform read and write operations on the application-specific data container.

* * * * *